US010749944B2

(12) United States Patent
Bogdan et al.

(10) Patent No.: US 10,749,944 B2
(45) Date of Patent: *Aug. 18, 2020

(54) SYSTEMS AND METHODS TO IMPROVE THE PERFORMANCE OF A NETWORK BY MORE EFFICIENT VIRTUAL NETWORK RESOURCE ALLOCATION

(71) Applicant: Shopify Inc., Ottawa (CA)

(72) Inventors: Pamela A. M. Bogdan, Neptune, NJ (US); Jane Threefoot, Little Silver, NJ (US)

(73) Assignee: Shopify Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,965

(22) Filed: Jan. 4, 2019

(65) Prior Publication Data

US 2019/0141122 A1    May 9, 2019

Related U.S. Application Data

(63) Continuation of application No. 15/601,101, filed on May 22, 2017, now Pat. No. 10,200,463.

(51) Int. Cl.
| | | |
|---|---|---|
| *G06F 15/173* | (2006.01) | |
| *H04L 29/08* | (2006.01) | |
| *G06F 9/50* | (2006.01) | |
| *H04L 12/24* | (2006.01) | |
| *H04L 12/26* | (2006.01) | |

(52) U.S. Cl.
CPC ........ *H04L 67/1021* (2013.01); *G06F 9/5077* (2013.01); *H04L 41/0896* (2013.01); *H04L 41/5025* (2013.01); *H04L 67/1023* (2013.01); *H04L 43/0852* (2013.01); *H04L 67/10* (2013.01)

(58) Field of Classification Search
CPC ....................... H04L 67/1023; H04L 67/1021
USPC ......................................................... 709/226
See application file for complete search history.

(56) References Cited

U.S. PATENT DOCUMENTS

| | | | |
|---|---|---|---|
| 9,430,262 B1 | 8/2016 | Felstaine et al. | |
| 9,794,187 B1 * | 10/2017 | Felstaine ............. | G06F 9/45558 |
| 10,200,463 B2 | 2/2019 | Bogdan et al. | |
| 2014/0101306 A1 | 4/2014 | Murgia | |

(Continued)

FOREIGN PATENT DOCUMENTS

WO    WO 2015/149600 A1    10/2015

OTHER PUBLICATIONS

"TL 9000 Quality Management System Committee Final 1.0"; NFV Workload Efficiency Whitepaper' QuEST Forum; Oct. 2016; 29 pages.

*Primary Examiner* — Hee Soo Kim
(74) *Attorney, Agent, or Firm* — GTC Law Group PC & Affiliates (57) ABSTRACT

A system and method for defragmentation of a VNF deployment in a virtual resource pool including implementing a VNF demand in an available VNF capacity, incorporating the implementation of the VNF demand in the deployed VNF capacity, obtaining improvement parameter data from the deployed VNF capacity, providing the improvement parameter data to a deployment improvement application; and redeploying the implementation of the VNF demand into the groomed VNF capacity, wherein the groomed VNF capacity comprises VNF capacity that improves network resource allocation.

17 Claims, 7 Drawing Sheets

(56) References Cited

U.S. PATENT DOCUMENTS

| | | | |
|---|---|---|---|
| 2015/0358248 A1* | 12/2015 | Saha | H04L 43/0817 |
| | | | 709/226 |
| 2016/0150076 A1* | 5/2016 | Foladare | H04M 3/42 |
| | | | 370/259 |
| 2016/0234082 A1* | 8/2016 | Xia | H04L 41/5096 |
| 2016/0246652 A1 | 8/2016 | Herdrich et al. | |
| 2016/0277509 A1* | 9/2016 | Qiang | H04L 67/16 |
| 2016/0352582 A1 | 12/2016 | Itsumi | |
| 2017/0012823 A1 | 1/2017 | Zhu et al. | |
| 2017/0048165 A1 | 2/2017 | Yu et al. | |
| 2017/0063598 A1 | 3/2017 | Zhu et al. | |
| 2017/0086111 A1* | 3/2017 | Vrzic | H04W 36/023 |
| 2017/0257276 A1* | 9/2017 | Chou | H04L 41/0823 |
| 2017/0371717 A1* | 12/2017 | Kiess | G06F 9/5077 |
| 2018/0173549 A1* | 6/2018 | Browne | H04L 41/0813 |
| 2018/0191838 A1* | 7/2018 | Friedman | H04L 67/148 |
| 2018/0241630 A1* | 8/2018 | Andrianov | H04L 41/0896 |
| 2018/0262410 A1* | 9/2018 | Chou | H04L 43/08 |
| 2018/0337981 A1 | 11/2018 | Bogdan et al. | |

\* cited by examiner

SYSTEMS AND METHODS TO IMPROVE THE PERFORMANCE OF A NETWORK BY MORE EFFICIENT VIRTUAL NETWORK RESOURCE ALLOCATION

CROSS REFERENCE TO RELATED APPLICATIONS

This application is a continuation of, and claims priority to, U.S. patent application Ser. No. 15/601,101 (now U.S. Pat. No. 10,200,463), filed May 22, 2017, entitled "Systems and Methods to Improve the Performance of a Network by More Efficient Virtual Network Resource Allocation," the entire contents of which are hereby incorporated herein by reference.

TECHNICAL FIELD

The present disclosure relates to a network system including virtual network functions, and more particularly to systems and methods to improve the performance of a network by more efficient virtual network resource allocations.

BACKGROUND

Telecom service providers are moving to a model that relies on a generic, industry-standard hardware infrastructure with the network functions themselves being implemented entirely in software. Consequently, the telecom industry is transitioning to network function virtualization (NFV). NFV provides new ways of structuring communications networks at a lower cost and with greater capability in network services. Virtualization allows for efficient sharing of physical resources.

Currently, most virtual implementations optimize speed of deployment. This can result in less than optimal usage of resources. Over time the gap between the optimal deployment and the actual deployment will grow unless corrective actions are taken. Consequently, in support of speed of delivery and a multi-sourced demand the physical and logical deployment of virtual network function (VNF) functionality and usage of all virtual resources will become non-optimized.

SUMMARY

According to one embodiment there is provided a method for improving network performance by more efficient resource allocations in a virtual network.

One general aspect includes a method including: identifying VNF functionality implemented across a set of virtual resources in a network, determining an allocation parameter associated with the VNF functionality and the set of virtual resources, and reallocating the VNF functionality in a subset of the set of virtual resources based on the allocation parameter.

Implementations may include one or more of the following features. The method where the allocation parameter includes delays due to physical distances of logical elements. The method where the allocation parameter includes reliability measured by an implementation of diversity and deployment into higher reliability resource pools. The method where the allocation parameter includes processing delays. The method where reallocating the VNF functionality includes defragmentation of the VNF functionality using dedicated purpose resource pools. The method where reallocating the VNF functionality includes: identifying VNF functionality to be reallocated, storing the VNF functionality to be reallocated in available capacity in the set of virtual resources, and moving the VNF functionality to be reallocated to the subset of the set of virtual resources. The method where the network includes more than one layer.

One general aspect includes a system including: a processor, a memory coupled to the processor and configured to store program instructions executable by the processor to identify VNF functionality implemented across a set of virtual resources in a network. The system also includes instructions to determine an allocation parameter associated with the VNF functionality and the set of virtual resources. The system also includes instructions to reallocate the VNF functionality in a subset of the set of virtual resources based on the allocation parameter.

One general aspect includes a non-transitory computer-readable storage medium, including program instructions, where the program instructions are computer-executable to: identify VNF functionality implemented across a set of virtual resources in a network; determine an allocation parameter associated with the VNF functionality and the set of virtual resources; and reallocate the VNF functionality in a subset of the set of virtual resources based on the allocation parameter.

DETAILED DESCRIPTION OF ILLUSTRATIVE EMBODIMENTS

The European Telecommunications Standards Institute (ETSI) is the de-facto standard developing organization (SDO) for the specification of the NFV high level architecture. ETSI has specified three components of the NFV architecture. These are the VNF's, the nodes and NFV Infrastructure.

Figure 1:
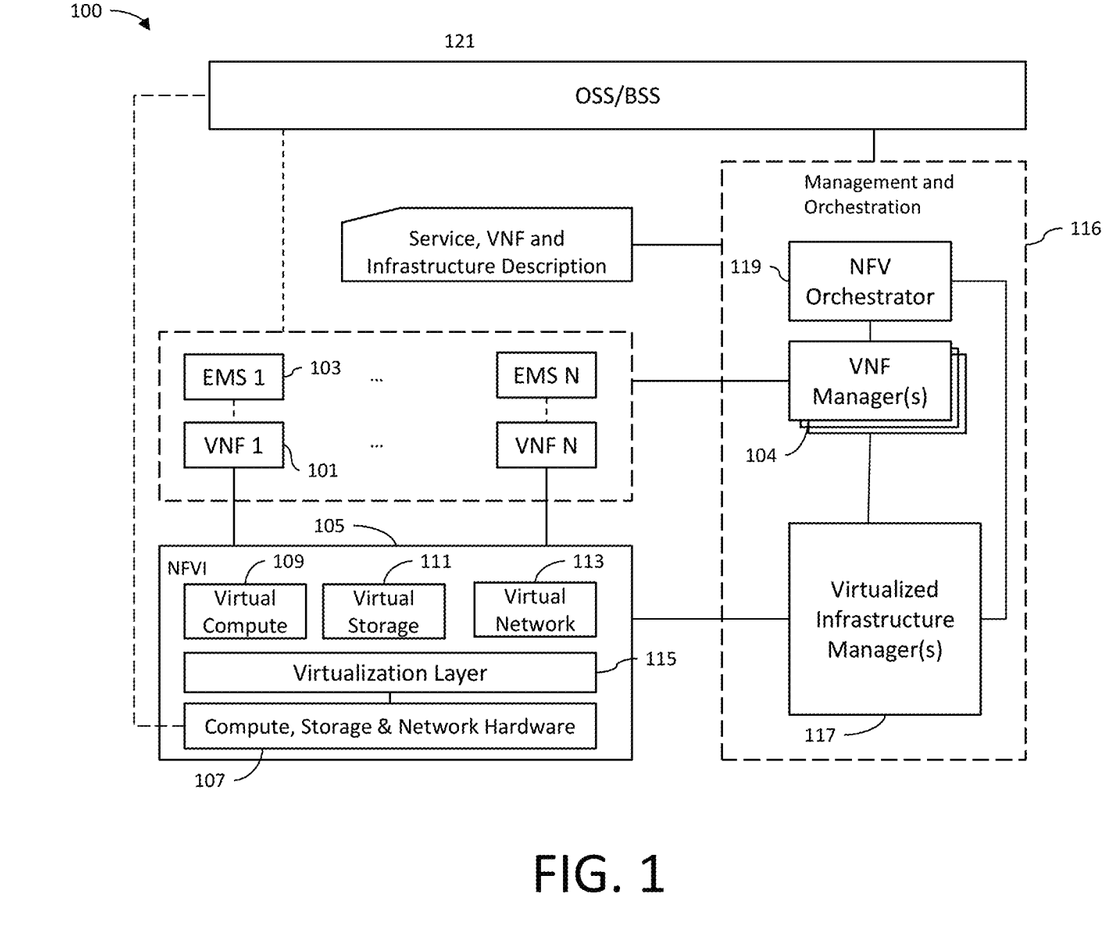
FIG. 1 is a block diagram of an NFV architecture.

Illustrated in FIG. 1 is an embodiment of an NFV architecture 100. The basic block in NFV architecture 100 is the VNF 101. It is the virtualized network element. For example a router or a base station may be virtualized as a VNF. Sub-functions of a network element may also be virtualized as a VNF. Other network elements that may be virtualized include firewalls, IPS, GGSN, SGSN, RNC, EPC etc. NFV architecture 100 also includes element managers (EM) 103 that are responsible for the functional management of VNF 101 i.e. FCAPS (Fault, Configuration, Accounting, Performance and Security Management). There may be one EM 103 per VNF 101 or an EM can manage multiple VNFs 101. The EM 103 may be a VNF. A VNF Manager 104 manages a VNF 101 or multiple VNFs 101 by setting up, maintaining and tearing down VNFs 101. Additionally VNF Manager 104 does the FCAPS for the virtual part of the VNF 101. VNF Manager 104 does the management for the virtual components while the EM does the management of functional components. NFV Infrastructure (NFVI 105) is the environment in which VNFs 101 run. NFVI 105 includes physical resources such as compute, memory and networking hardware 107, virtual compute resources 109, virtual storage resources 111 and virtual network resources 113. NFVI 105 also includes virtualization layer 115, which is responsible for abstracting physical resources into virtual resources. This layer decouples software from hardware which enables the software to progress independently from hardware. The NFV architecture 100 also includes management and orchestration component 116. The management and orchestration component 116 includes a virtualized infrastructure manager 117 is the management system for NFVI 105. It is responsible for controlling and managing the NFVI compute, network and storage resources within one operator's infrastructure domain. It is also responsible for collection of performance measurements and events. NFV Orchestrator 119 generates, maintains and tears down network services of VNFs 101. If there are multiple VNFs 101, orchestrator will enable creation of end to end service over multiple VNFs 101. NFV Orchestrator 119 is also responsible for global resource management of NFVI 105 resources. For example managing the NFVI resources i.e. compute, storage and networking resources among multiple VIMs in the network.

Figure 2:
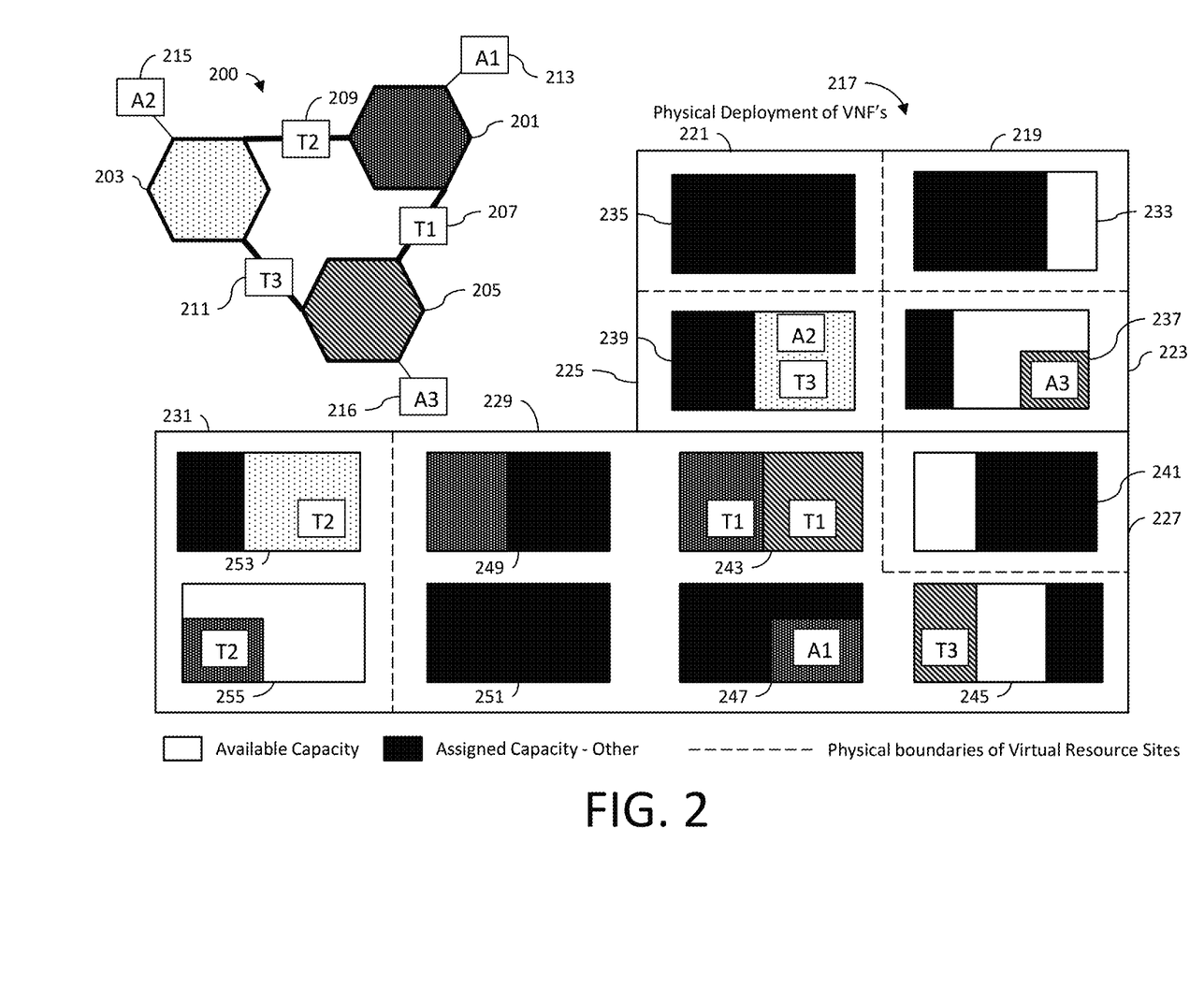
FIG. 2 is a block diagram illustrating an example of VNF deployment in a network that is not optimized.

Illustrated in FIG. 2 is a core network 200 having application 201, application 203 and application 205. Application 202, application 203 and application 205 may be VNFs such as virtual routers. The core network may include any type of network topology (star, ring, mesh, etc.). Application 201 is connected to application 205 by means of trunk T 1 (trunk 207). Application 203 is connected to application 201 by means of trunk T 2 (Trunk 209) and application 205 is connected to application 203 by means of trunk T3 (Trunk 211). A trunk is a communications line or link designed to carry multiple signals simultaneously to provide network access between two points. Trunks typically connect switching centers in a communications system. The signals can convey any type of communications data. A trunk can consist of multiple wires, cables or fiber optic strands bundled together to maximize the available bandwidth in a single physical cable, or it can consist of a single high-capacity link over which many signals are multiplexed. Access to the core network 200 is provided by access points A1, A2 and A3 (access point 213, access point 215 and access point 216).

Also shown in FIG. 2 is an example of a physical deployment 217 of the VNFs. The VNFs are deployed in data centers, including data center 219, data center 221, data center 223, data center 225, data center 22, data center 229 and data center 231. The number of data centers in this example is illustrative only; any number of data centers may be included in the physical deployment 217. Each data center may include hardware such as industry standard server hardware. The physical deployment 217 may include hardware 233 deployed in data center 219 having a portion of its capacity assigned to other uses and a portion of its capacity being available for use. Hardware 235 may be deployed in data center 221 having all of its capacity assigned to other uses. Hardware 237 may be deployed in data center 223 and is shown as having a portion of its capacity assigned to other uses, a portion of its capacity available and a portion of its capacity assigned to a portion of application 205 and the access point 213 (A1). Hardware 239 is shown as having a portion of its capacity assigned to other uses and the remainder capacity assigned to a portion of application 203 including access point 215 (A2) and trunk 211 (T3). Hardware 241 is shown deployed in data center 227 and having a portion of its capacity assigned to other uses and a portion of its capacity available for use. Data center 229 is illustrated as including hardware 243, hardware 245, hardware 247, hardware 249, and hardware 251. Hardware 243 is shown as having a portion of its capacity assigned to a portion of application 201 including trunk 207 (T1) and the remainder assigned to a portion of application 205 including trunk 207 (T1). Hardware 245 is shown as having some of its capacity assigned to other uses, some available capacity and some of its capacity assigned to a portion of application 205 including trunk 211 (T3). Hardware 247 is shown with a portion of its capacity assigned to other uses and the remainder assigned to a portion of application 201, including access point 213 (A1). Hardware 249 is shown with a portion of its capacity assigned to other uses and the remainder assigned to a portion of application 201. Hardware 251 is shown with all of its capacity assigned to other uses. Hardware 253 and hardware 255 are shown as deployed in data center 231. Hardware 253 is shown as having a portion of its capacity assigned to other uses and the remainder assigned to application 203 including trunk 209 (T2). Hardware 255 is shown with some of its capacity assigned to a portion of application 210, including trunk 209 (T2) and the remainder as available capacity. FIG. 2 shows an implementation that is not optimized. For example, application 201 is divided among equipment 247 in data center 229, equipment 243 in data center 229 and equipment 255 in data center 255. Similarly, application 205 is divided among equipment 243 and equipment 245 in data center 229 and equipment 237 in data center 223. A portion of application 203 may be in one building (data center 225) and another portion May be somewhere else (data center 231) and in order to get from trunk 207 (T1) to trunk 209 (T2) one would have to go in and out across both location thereby losing the efficiency of having a single core routers.

Figure 3:
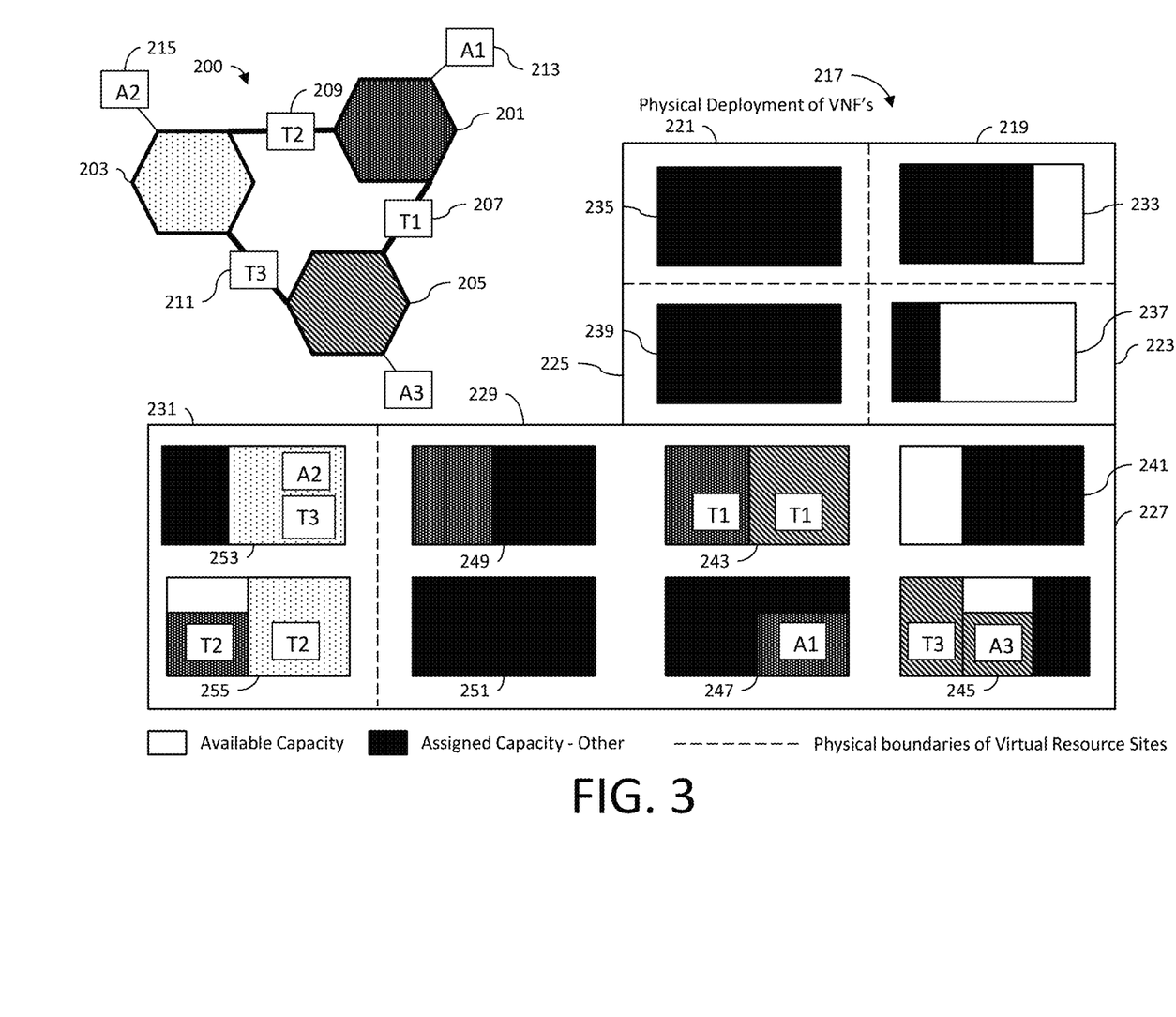
FIG. 3 is a block diagram illustrating an example of an improved VNF deployment in a single layer of a network.

FIG. 3 illustrates the result after the applications are redistributed (e.g. through the management and orchestration component 116) after the allocation method described below is implemented. In this example, the portion of the application 203 that was deployed in equipment 239 in data center 225 is moved to equipment 255 in data center 231. The result is that the entire application 203 is deployed in data center 231. Similarly the portion of application 205 that was deployed in equipment 237 in data center 223 is moved to equipment 245 in data center 227 resulting in the entire application 205 being deployed in data center 227. This allocation improves the performance of the network by more efficiently allocating the virtual network resources.

Figure 4:
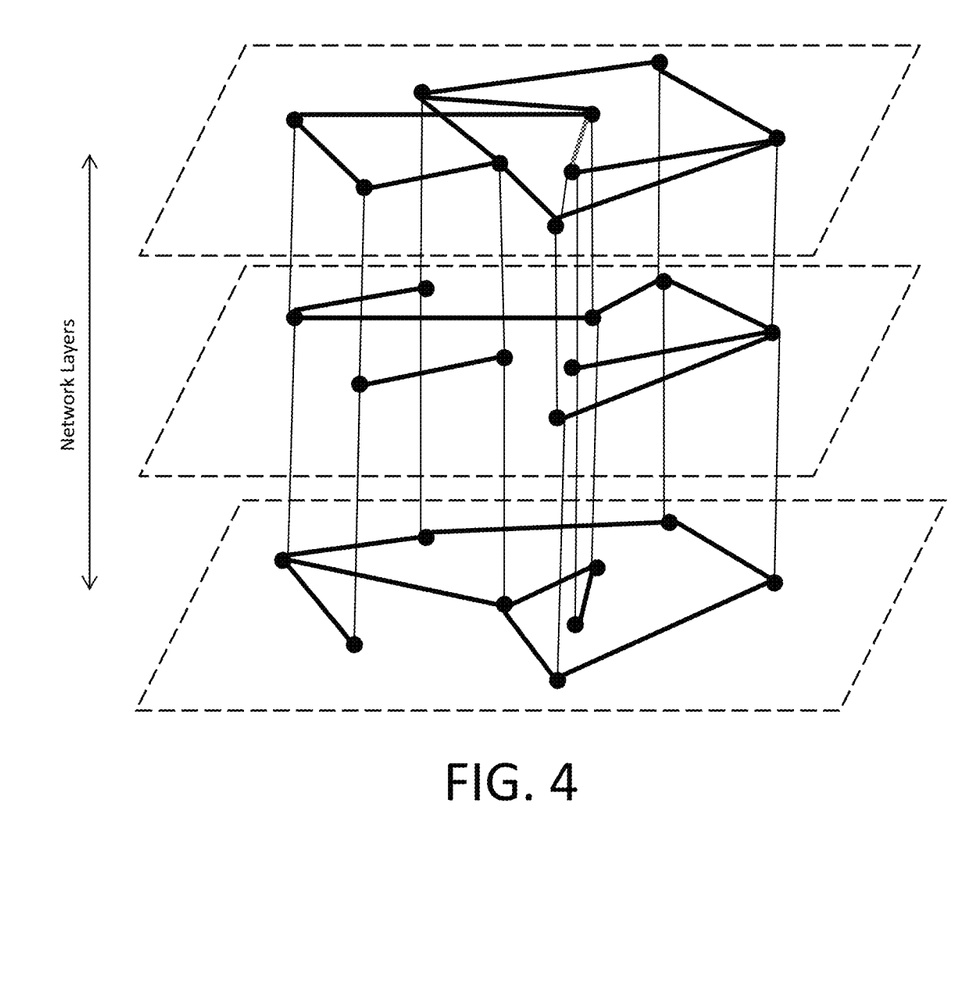
FIG. 4 is a schematic illustrating the multilayer awareness of the method for allocating virtual network resources.

FIG. 4 illustrates that the implementation methodology requires multilayer awareness to provide efficient implementation at all layers of the network. Consequently, virtual network resource allocations should be performed across all layers of the network.

Figure 5:
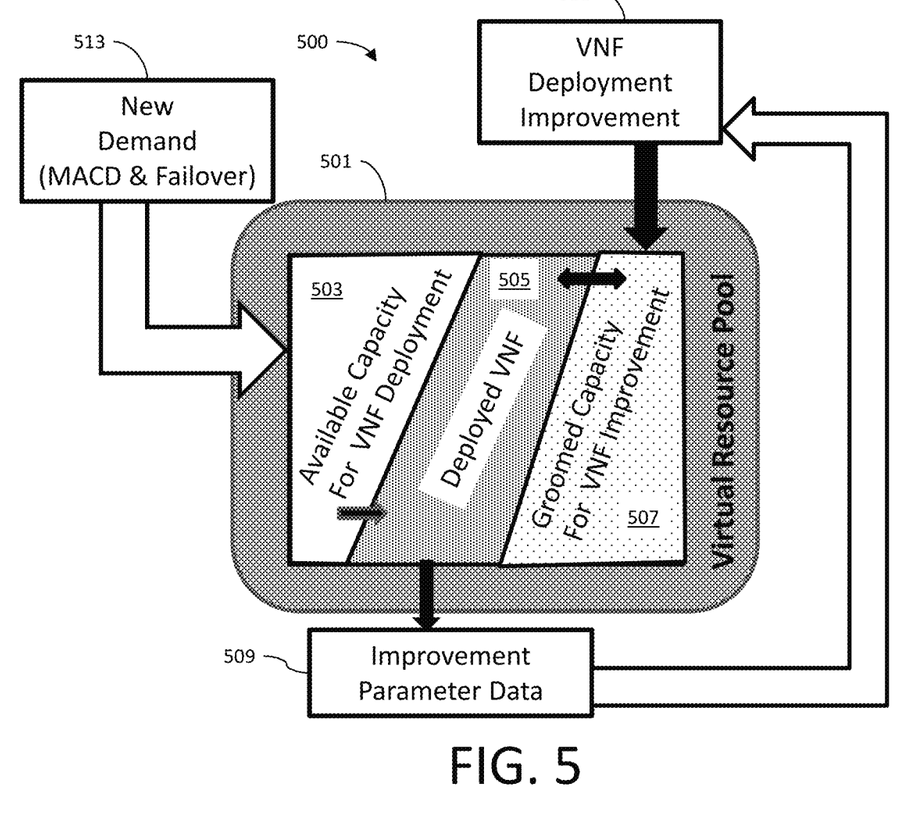
FIG. 5 is a block diagram illustrating a method for the defragmentation of VNF deployments using dedicated purpose available capacity pools

FIG. 5 illustrates an example architecture 500 for defragmentation of VNF deployments using dedicated purpose available capacity pools. Virtual resource pool 501 includes available capacity for VNF deployment 503, used capacity for deployed VNF 505 and groomed capacity for VNF improvement 507. Groomed capacity for VNF improvement 507 indicates the capacity that has been groomed to improve the network resource allocation. The deployed VNF capacity reflects ungroomed virtual network resource allocation. Improvement parameter data 509 is obtained from the deployed VNF capacity 505 and is provided to a VNF deployment improvement application 511 which then redeploys the VNFs to improve performance. When new demand, including Move, Add, Change, Delete (MACD) and failover is initially implemented it may be implemented in the available capacity for VNF deployment 503. The new implementation would then be incorporated into the deployed VNF 505. Improvement parameter data may be extracted from the deployed VNF 505. That data may be transmitted to VNF deployment improvement application 511 which will effect a change in the location of the VNF consistent with the improvement parameter data. The deployed VNF will be temporarily stored in available capacity for VNF employment 503 while the VNF deployment improvement application 511 determines a more efficient location for the deployed VNF the groomed capacity for VNF improvement 507. The VNF implementations may be effected in the same data centers or in the same resources to avoid fragmentation of the VNF.

Figure 6:
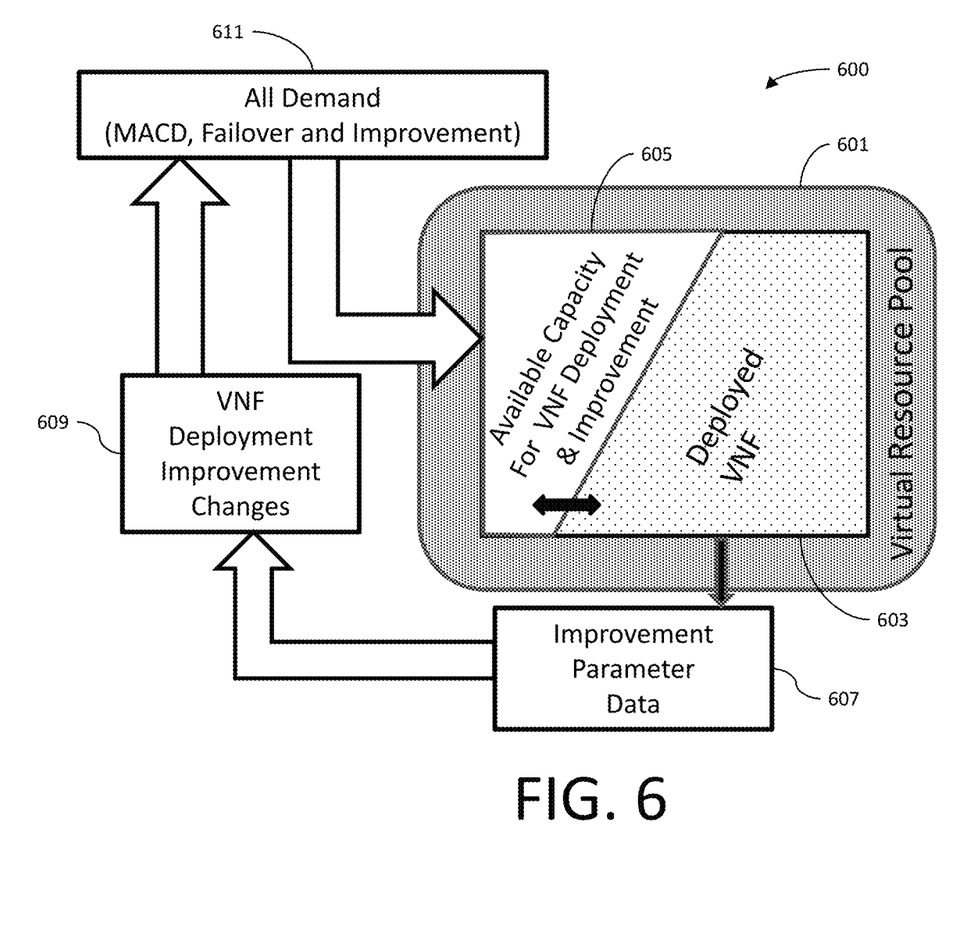
FIG. 6 is a block diagram illustrating an example of a method for consolidated VNF deployment flow for new demand and deployment improvement changes using shared available capacity pools

FIG. 6 illustrates an example architecture 600 for consolidated VNF deployment flow for new demand and deployment improvement changes using shared available capacity pools. Virtual resource pool 601 includes deployed (used) VNF capacity 603 and available capacity for VNF deployment and improvement 605. Improvement parameter data 607 is acquired from the deployed VNF capacity 603 and the available capacity for VNF deployment and improvement 605. The data is transmitted to a VNF deployment improvement application that implements VNF deployment improvement changes 609 and communicates those changes to the capacity demand function (All demand 611). In this example initial deployment is made concurrently with grooming so that there is no need for a separate pool for optimization. The available capacity for VNF deployment and improvement 605 is used for both optimization and new implementation so that the optimization algorithm is run concurrently with the initial resource allocation.

Figure 7:
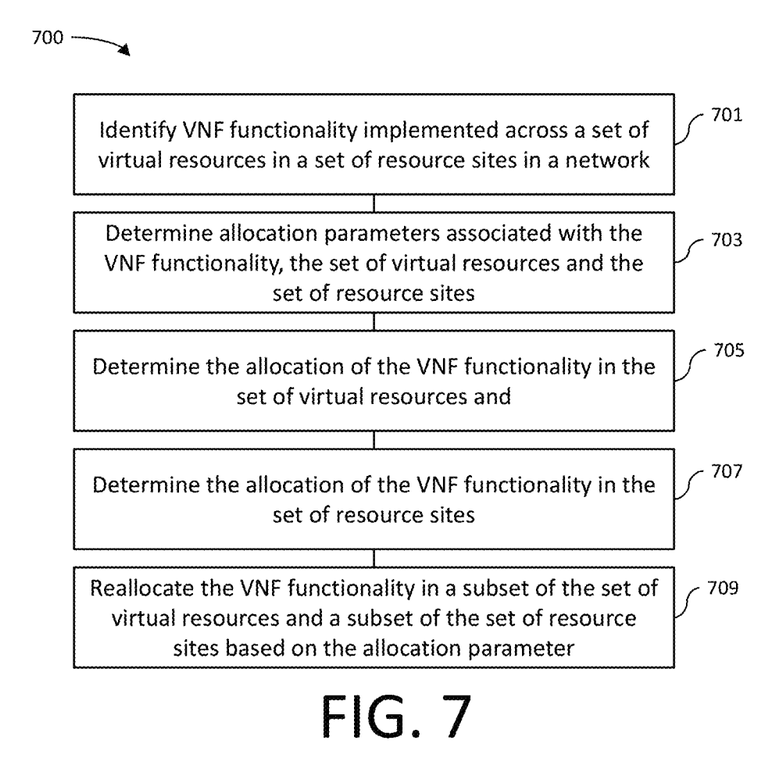
FIG. 7 is a flowchart of a method for allocating virtual networks resources.

Illustrated in FIG. 7 is a flowchart of a method 700 for improvement of deployment of VNFs in a network.

In step 701 the method 700 identities VNF functionality implemented across a set of virtual resources in a set of resource sites in a network.

In step 703 the method 700 determines allocation parameters associated with the efficiency of the VNF functionality implemented across the set of virtual resources, the set of virtual resources and the set of resource sites. Examples of allocation parameters may include:
  delay inserted due to physical distances of logical elements (e.g. separate virtual resources or geographically distinct locations);
  reliability that may be improved through implementation of diversity and deployment into higher reliability resource pools (e.g. deployment in the data center having greater reliability);
  processing delays that may be reduced by reallocation of VNF;
  grooming for failure response and restoration (for example, if a site fails, reallocating all of the VNF functionality to an operating site); and
  controls or isolation due to security situation.

In step 705 the method 700 determines the allocation of VNF functionality in the set of virtual resources to improve efficiency of the VNF.

In step 707 the method 700 determines the allocation VNF functionality in the set of resource sites to improve efficiency of the VNF.

In step 709 the method 700 reallocates the VNF functionality in a subset of the set of virtual resources and a subset of the set of resource sites based on the allocation parameter. For example, the VNF functionality may be reallocated to on resource site or one server at a resource site instead of being partially deployed at different resource sites.

The method 700 provides a methodology that allows for continual re-allocation of VNFs.

The methods described in the examples may be embodied directly in hardware, in a software module executed by a processor, or in a combination of the two. A software module may reside in any form of memory or storage medium such as RAM memory, flash memory, ROM memory, EPROM memory, EEPROM memory, registers, hard disk, a removable disk, a CD-ROM. The memory or storage medium may be coupled to the processor such that the processor can read information from, and write information to, the memory or storage medium. Alternatively, the storage medium may be integral to the processor. The processor and the storage medium may reside in an application-specific integrated circuit (ASIC). In some aspects, the steps and/or actions of a method may reside as one or any combination or set of codes and/or instructions on a machine readable medium and/or computer readable medium, which may be incorporated into a computer program product.

In any of the exemplary embodiments, the described functions may be implemented in hardware, software, firmware, or any combination thereof. Functions implemented in software may be stored on or transmitted over as instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed examples is provided to enable any person skilled in the art to make or use embodiments of the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed:

1. A method for defragmentation of a VNF deployment in a virtual resource pool having an available VNF capacity, a deployed VNF capacity and a groomed VNF capacity comprising:
  implementing a VNF demand in the available VNF capacity;
  incorporating the implementation of the VNF demand in the deployed VNF capacity;
  obtaining improvement parameter data from the deployed VNF capacity;

providing the improvement parameter data to a deployment improvement application; and
redeploying the implementation of the VNF demand into the groomed VNF capacity,
wherein the groomed VNF capacity comprises VNF capacity that improves network resource allocation.

2. The method of claim 1 wherein the VNF demand comprises a demand selected from a group comprising Move, Add, Change, Delete and failover.

3. The method of claim 1 wherein the improvement parameter data comprises processing delays.

4. The method of claim 1 wherein the improvement parameter data comprises delays due to physical distance of logical elements.

5. The method of claim 1 wherein the improvement parameter data comprises reliability measured by an implementation of diversity and deployment into higher reliability resource pools.

6. The method of claim 1 wherein redeploying the implementation of the VNF demand comprises determining a new location for the implementation of the VNF demand in the groomed VNF capacity consistent with the improvement parameter data.

7. A system comprising:
a processor
a memory coupled to the processor and configured to store program instructions executable by the processor to:
implement, in a virtual resource pool having an available VNF capacity, a deployed VNF capacity and a groomed VNF capacity, a VNF demand in the available VNF capacity;
incorporate the implementation of the VNF demand in the deployed VNF capacity;
obtain improvement parameter data from the deployed VNF capacity;
provide the improvement parameter data to a deployment improvement application; and
redeploy the implementation of the VNF demand into the groomed VNF capacity,
wherein the groomed VNF capacity comprises VNF capacity that improves network resource allocation.

8. The system of claim 7 wherein the VNF demand comprises a demand selected from a group comprising Move, Add, Change, Delete and failover.

9. The system of claim 7 wherein the improvement parameter data comprises processing delays.

10. The system of claim 7 wherein the improvement parameter data comprises delays due to physical distance of logical elements.

11. The system of claim 7 wherein the improvement parameter data comprises reliability measured by an implementation of diversity and deployment into higher reliability resource pools.

12. The system of claim 7 wherein the program instruction executable by the processor to redeploy the implementation of the VNF demand comprises determining a new location for the implementation of the VNF demand in the groomed VNF capacity consistent with the improvement parameter data.

13. A non-transitory computer-readable storage medium, comprising program instructions, wherein the program instructions are computer-executable to:
implement, in a virtual resource pool having an available VNF capacity, a deployed VNF capacity and a groomed VNF capacity, a VNF demand in the available VNF capacity;
incorporate the implementation of the VNF demand in the deployed VNF capacity;
obtain improvement parameter data from the deployed VNF capacity;
provide the improvement parameter data to a deployment improvement application; and
redeploy the implementation of the VNF demand into the groomed VNF capacity,
wherein the groomed VNF capacity comprises VNF capacity that improves network resource allocation.

14. The non-transitory computer-readable storage medium of claim 13 wherein the VNF demand comprises a demand selected from a group comprising Move, Add, Change, Delete and failover.

15. The non-transitory computer-readable storage medium of claim 13 wherein the improvement parameter data comprises processing delays.

16. The non-transitory computer-readable storage medium of claim 13 wherein the improvement parameter data comprises delays due to physical distance of logical elements.

17. The non-transitory computer-readable storage medium of claim 13 wherein the improvement parameter data comprises reliability measured by an implementation of diversity and deployment into higher reliability resource pools.

* * * * *